Patented Sept. 2, 1941

2,254,254

UNITED STATES PATENT OFFICE 2,254,254

METHOD OF MOLDING ARTICLES

Charles E. Wooddell, Niagara Falls, N. Y., assignor to The Carborundum Company, Niagara Falls, N. Y., a corporation of Delaware No Drawing. Application October 30, 1937, Serial No. 171,989

4 Claims. (Cl. 51—293)

This invention relates to a method of molding plastic mixes containing granular material and a binder therefor into articles of the desired shape.

The present application is a continuation in part of my copending application Serial No. 716,327 filed March 19, 1934, which has matured into Patent No. 2,097,654, granted November 2, 1937.

Various methods have been used heretofore in molding mixtures containing granular material and a resinoid binder therefor and while they have been generally satisfactory, they have not been satisfactory for the production of articles having a high density and a certain amount of porosity such as is desirable and necessary in some types of articles such as certain kinds of abrasive articles.

One difficulty that has been encountered in the manufacture of high density articles of the kind referred to above is that the articles have bloated during the curing of the articles made by what is commonly known as the cold molding process. This bloating is attributed to the evolution of gases during the curing operation. The article being dense, there is no ready way for the gases to leave the interior of the article and consequently they build up sufficient pressure to cause the article to swell and become what is commonly called bloated.

The other well known process of molding articles, which is commonly referred to as the hot molding method, has not been satisfactory for high density articles of the kind referred to above because the simultaneous pressing and heating causes the mixture to agglomerate into an article that is practically devoid of porosity and although the present application concerns high density articles, it is desirable and necessary to have a certain amount of porosity in certain kinds of articles, for example in articles comprising abrasive grains bonded to form an abrasive article.

In my copending application referred to above, I disclosed a method by which articles of very fine granular material and the binder therefor could be molded. The method disclosed in that application comprises the steps of applying a high pressure to the mixture at ordinary temperatures to compress or consolidate it into an article of the desired shape and then curing the article at an elevated temperature while the article is being subjected to pressure less than that used to form it.

I have found that the steps thus disclosed are useful also in the production of high density articles in which the granular material is not finely divided like the polishing powders of the application referred to but is considerably coarser.

I have found that by molding a plastic mixture of powdered resin and granular material, by which term I mean to distinguish from such materials as polishing powders, by the application of a high pressure, for example 5000 pounds per square inch or more, and then curing the article under a pressure just sufficient to resist the tendency of the article to swell and bloat, I can make a highly satisfactory high density article.

One specific way by which I carry out the present invention is given in the following example:

A quantity of granular material is wetted with a small quantity of a plasticizing liquid such as furfural, cresol, liquid resin or a solution of resin, and then dry powdered resinous material is added to and mixed with the thus wetted granular material. The ingredients are so proportioned that a moldable consistency is produced. By a moldable consistency I mean one that is neither too gummy nor too dry for satisfactory molding. In some cases the mixture of granular material and dry powdered resin will be found to have suitable molding consistency without a plasticizer.

The mixture thus formed is then placed in a mold and compressed to the desired shape by the application of a suitable pressure. I have found that a pressure of 5000 pounds per square inch produces an article of the desired density for some purposes. For other purposes higher pressures can be used. For still other purposes it may be desirable to use lower pressures than 5000 pounds per square inch but generally speaking the difficulties encountered when pressures considerably less than 5000 pounds per square inch are used are not of the magnitude encountered when the higher pressures are utilized.

Having compressed the article to the desired shape by the application of a suitable pressure and while the said pressure is still applied, I then clamp together the parts of the mold so that the article formed and contained therein is confined within the thus clamped mold. I then remove the mold and the article contained therein from the pressing means, for example a hydraulic press, and place it in an oven for the purpose of curing the resinous material. The curing of the article is accomplished by applying sufficient heat while the article is confined within the clamped mold to cause the resinous material to bind the granular material into a strong firm article.

I have found that what is commonly known in the art as a stop mold serves very well for carrying out the above process. A mold of this kind has means incorporated in it, or is used in conjunction with external means, that limit the amount of compacting obtainable no matter what the applied pressure may be. With a mold of this kind, the amount of mix placed therein is carefully adjusted so that its compression to the limit of the mold will be exactly the amount required and an article of predetermined volume will be produced. The outstanding advantage of the use of such a mold in the present process is that the article contained therein is not further compressed during the heating period by externally applied pressure. Another advantage in using stop molds in the present process is that during the curing operation they can be stacked one upon another, without clamping each one, and a suitable weight, clamp or pressure applied to the top one.

Similar results can be obtained by following the above procedure up to and including the step of applying the compacting pressure and then, instead of clamping the mold, reducing the pressure to an intensity sufficient to prevent bloating of the mix during the subsequent heating operation. With the article under such reduced pressure, the curing of the resin is accomplished by heating the mix in the mold.

While the above methods recite that the compressed mix is retained in the mold in which it was compressed, similar results can be obtained by removing the article from the mold in which it has been compressed and carrying out the curing step by heating the article in a container, for example another mold or any container adapted to keep the article confined to the shape produced by the previous pressing step.

I have found that by the herein disclosed method I can produce satisfactory articles having a density greater than that obtainable by any of the previous known methods. This high density is particularly valuable in certain kinds of abrasive articles where such articles must produce good finish on the work and at the same time must have a long grinding life.

The articles made by the method herein disclosed are strong, dense, having long lasting characteristics and are free from bloating and other imperfections and undesirable characteristics resulting from the curing of the bonding material.

Having thus described my invention what I claim is:

1. The method which comprises forming a mixture containing granular abrasive material and a resinoid, pressing said mixture in a mold to form an article, and heating the said article while it is under a pressure less than that used in forming the mixture into an article.

2. The method which comprises forming a mixture containing granular abrasive material and a resinoid, pressing said mixture in a mold to form an article, reducing the pressure applied to the mixture to form the article and heating the article while it still is subjected to such reduced pressure.

3. The method which comprises forming a mixture containing granular abrasive material and a resinoid, pressing said mixture in a mold to form an article, clamping the mold with the said article therein while the forming pressure still is being exerted upon the article, removing the forming pressure from the article and heating the article while it still is clamped in the mold.

4. The method which comprises forming a mixture containing granular abrasive material and a resinoid, pressing said mixture in a stop mold to form an article of predetermined volume, clamping the mold with the said article therein while the forming pressure still is being exerted upon the article, removing the forming pressure from the article and heating the article while it still is clamped in the mold.

CHARLES E. WOODDELL.